United States Patent
Dong

(10) Patent No.: US 9,535,453 B2
(45) Date of Patent: Jan. 3, 2017

(54) ELECTRONIC DEVICE AND PROTECTIVE HOUSING OF THE ELECTRONIC DEVICE

(71) Applicant: Lenovo (Beijing) Co., Ltd., Beijing (CN)

(72) Inventor: Shujie Dong, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/671,185

(22) Filed: Mar. 27, 2015

(65) Prior Publication Data

US 2016/0157368 A1 Jun. 2, 2016

(30) Foreign Application Priority Data

Dec. 1, 2014 (CN) .......................... 2014 1 0720366

(51) Int. Cl.
*H05K 7/00* (2006.01)
*H05K 5/00* (2006.01)
*A47B 96/06* (2006.01)
*G06F 1/16* (2006.01)

(52) U.S. Cl.
CPC .................................. *G06F 1/1626* (2013.01)

(58) Field of Classification Search
CPC .................................................... G06F 1/1656
USPC ....................................... 361/679.01–679.03
See application file for complete search history.

(56) References Cited

U.S. PATENT DOCUMENTS

| 6,016,248 A * | 1/2000 | Anzai ................... G06F 1/1626 248/463 |
| 2014/0131251 A1* | 5/2014 | Westrup ................. A45C 11/00 206/756 |
| 2015/0277500 A1* | 10/2015 | Turowski ............. G06F 1/1656 361/679.56 |

* cited by examiner

*Primary Examiner* — Jerry Wu
(74) *Attorney, Agent, or Firm* — Harness, Dickey & Pierce, P.L.C.

(57) ABSTRACT

An electronic device is provided according to the present application. The electronic device includes a housing provided with a sliding groove. A protrusion extending towards an inner side of the sliding groove is provided at an upper edge of the sliding groove, a slidable elastic strip is slidably cooperated between the protrusion and the bottom of the sliding groove. The slidable elastic strip includes two slidable components and an elastic component, and the two slidable components are fixedly connected to two ends of the elastic component, respectively. The housing is provided with at least two locking structures which are detachably connected to the two slidable components, respectively, and are configured to allow the elastic component to slide out of the sliding groove to form a convex structure perpendicular to the housing in a case that the slidable components are immobilized to the locking structure. The structure in the present application is simple and convenient to use.

20 Claims, 4 Drawing Sheets

ELECTRONIC DEVICE AND PROTECTIVE HOUSING OF THE ELECTRONIC DEVICE

This application claims the benefit of priority to Chinese Patent Application No. 201410720366.6 titled "ELECTRONIC DEVICE AND PROTECTIVE HOUSING OF THE ELECTRONIC DEVICE", filed with the Chinese State Intellectual Property Office on Dec. 1, 2014, the entire disclosure of which is incorporated herein by reference.

TECHNICAL FIELD

The present application relates to an electronic device.

BACKGROUND

A supporter of a related electronic device is generally a protective sleeve structure or an individual frame structure. However, regardless of the protective sleeve or the individual frame structure of the electronic device, the volume of the electronic device is increased, causing an inconvenient usage to users. Further, such additional protective sleeve or individual frame structure can cause radio frequency interference to the electronic device, and adversely affect the appearance of the electronic device.

Therefore, a new type of electronic device is required to be developed.

SUMMARY

An electronic device is provided according to the present application, which includes a housing, a sliding groove provided on the housing, a slidable elastic strip slidably received in the sliding groove, and at least one locking position provided in the sliding groove, wherein in a case that at least one part of the slidable elastic strip slides to the at least one locking position and is immobilized at the at least one locking position, the slidable elastic strip is elastically deformed to a convex structure.

DETAILED DESCRIPTION

For further illustrating the technical means and the effects of the present application, the embodiments, structures, features and effects of the present application will be described in detail in conjunction with drawings and embodiments hereinafter. In the following description, "an embodiment" or "the embodiment" appeared at different positions may not refer to a same embodiment. In addition, the specific features, structures, or characteristics in one or more embodiments may be combined in any form.

Electronic Device Embodiments:

An electronic device as shown in FIGS. 1 to 5 includes: a display device including a display output area; a housing, wherein the display device is fixedly arranged in the housing, and the display output area of the display device is exposed via a first window of the housing; a sliding groove 1 provided on an outer surface of the housing; a slidable elastic strip including two slidable components and an elastic component 10, wherein the elastic component 10 is fixedly arranged between the two slidable components, and the two slidable components are cooperatively connected to the sliding groove 1, and each of the two slidable components is slidable in the sliding groove 1; wherein at least two locking positions are provided in the sliding groove 1, and in a case that any one of the two slidable components slides to any one of the at least two locking positions under the action of an external force, the slidable component is immobilized with respect to the sliding groove 1, which forces the elastic component 10 to deform elastically into a convex structure with respect to the outer surface of the housing, and the convex structure can be used as a supporter of the electronic device and support the electronic device on a support surface. The at least two locking positions comprises at least one locking position pair which has two locking positions, between which there is a distance smaller than the length of the slidable elastic strip.

The at least two locking positions include a first locking position located at two ends of the sliding groove 1, and a second locking position located in the middle of the sliding groove 1.

The sliding groove 1 provided with two locking positions is further described hereinafter.

Figure 1:
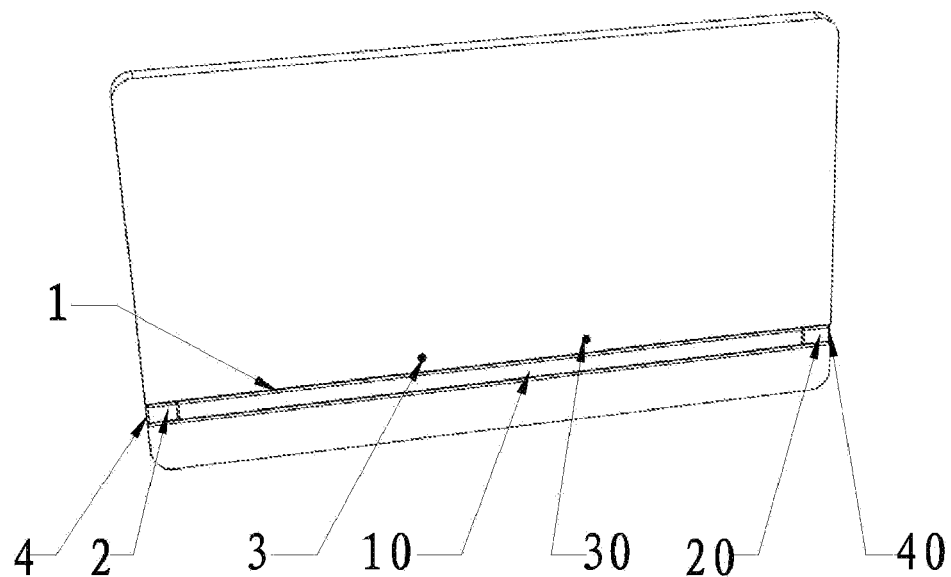
FIG. 1 is a structural schematic view showing an electronic device according to an embodiment of the present application.
Figure 2:
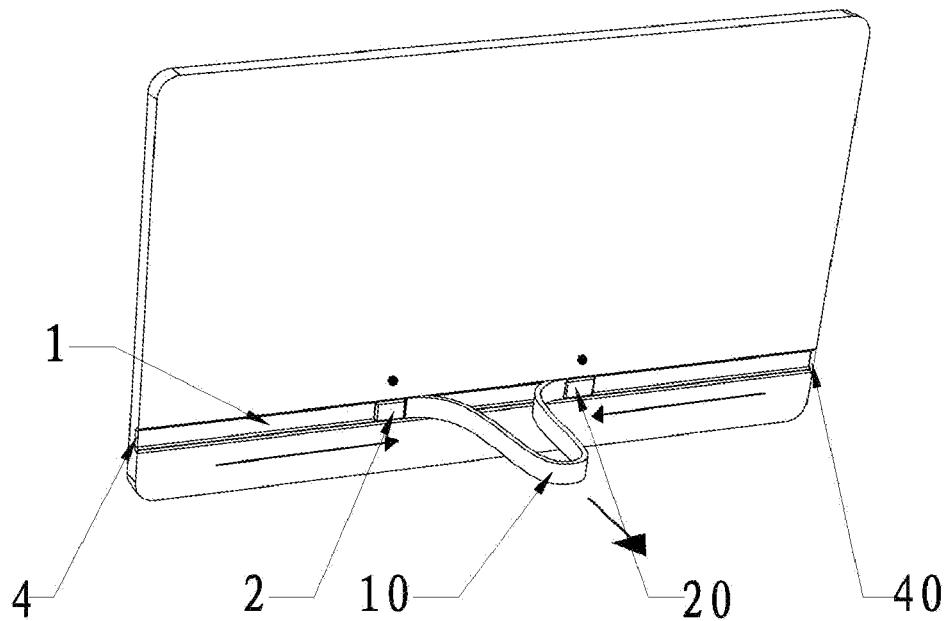
FIG. 2 is a structural schematic view showing the electronic device in a supported state according to the embodiment of the present application.

The second locking position include a first locking location 3 and a second locking location 30. The two slidable components are respectively a first slidable component 2 and a second slidable component 20. As shown in FIG. 2, the first slidable component 2 slides to the first locking location 3 under the action of an external force and then the first slidable component 2 is immobilized with respect to the sliding groove 1. The second slidable component 20 slides to the second locking location 30 under the action of an external force and then the second slidable component 20 is immobilized with respect to the sliding groove 1. The elastic component 10 deforms elastically, forming a convex structure with respect to the outer surface of the housing. The convex structure can be used as a supporter for the electronic device, and support the electronic device on a support surface. The distance between the first locking location 3 and the second locking location 30 is smaller than the length of the slidable elastic strip.

As an alternative embodiment, four side walls of the sliding groove 1 are respectively a first sliding groove length, a second sliding groove length, a first sliding groove width 4 and a second sliding groove width 40. The first locking position is the first sliding groove width 4 or the second sliding groove width 40. When the elastic component 10 is stretched, the first slidable component 2 is close to or contacts the first sliding groove width 4, and the second slidable component 20 is close to or contacts the second sliding groove width 40. The first slidable component 2 slides to the first locking location 3 under the action of an external force and then the first slidable component 2 is immobilized with respect to the sliding groove 1. The second slidable component 20 abuts against the second sliding groove width 40. The elastic component 10 deforms elastically, forming a convex structure with respect to an outer surface of the housing. The convex structure can be used as a supporter for the electronic device, and support the electronic device on a support surface.

As an alternative embodiment, the first slidable component 2 slides to the second locking location 30 under the action of an external force and then the first slidable component 2 is immobilized with respect to the sliding groove 1. The second slidable component 20 abuts against the second sliding groove width 40. The elastic component 10 deforms elastically, forming a convex structure with respect to the outer surface of the housing. The convex structure can be used as a supporter for the electronic device, and support the electronic device on a support surface. Compared with the above embodiments, the height of the convex structure is greater, thus the angle between the electronic device and a support surface is greater as well.

As an alternative embodiment, the first slidable component 2 abuts against the first sliding groove width 4, and the second slidable component 20 slides to the second locking location 30 or the first locking location 3 under the action of an external force, and then the first slidable component 2 is immobilized with respect to the sliding groove 1, forming convex structures with various heights to form various angles between the electronic device and a support surface.

As an alternative embodiment, a third locking location is provided between the first locking position 3 and the first sliding groove width 4. The first slidable component 2 or the second slidable component 20 slides to the third locking location under the action of an external force, and then the first slidable component 2 or the second slidable component 20 is immobilized with respect to the sliding groove 1, forming convex structures with various heights.

The at least two locking positions comprises at least one locking position pair which has two locking positions, between which there is a distance smaller than the length of the slidable elastic strip. The above arrangement is for forming a convex structure when the slidable components are immobilized at the locking positions where it has a distance therebetween smaller than the length of the slidable elastic strip.

As an alternative embodiment, a fourth locking location is provided between the second locking location 30 and the second sliding groove width 40. The first slidable component 2 or the second slidable component 20 slides to the fourth locking location under the action of an external force, and then the first slidable component 2 or the second slidable component 20 is immobilized with respect to the sliding groove 1.

The specific positions for the third locking location and the fourth locking location may be calculated according to a preset angle formed between the electronic device and a support surface when the electronic device is supported.

As an alternative embodiment, an outer surface of the electronic device is a rectangle, which includes a first length edge, a second length edge, a first width edge and a second width edge. The first locking location 3 is close to the first width edge, and the second locking location 30 is close to the second width edge. The sliding groove 1 is a rectangle, and the first sliding groove length is arranged to be close to the first length edge; and the first sliding groove width 4 is arranged to be close to the first width edge. The first sliding groove length is in parallel with the first length edge.

For the electronic device being supported by the convex structure, following four situations are included: 1) when the electronic device is supported by the first length edge and the convex structure, an angle between the electronic device and a support surface is $\angle\alpha$; 2) when the electronic device is supported by the second length edge and the convex structure, the angle between the electronic device and a support surface is $\angle\beta$; 3) when the electronic device is supported by the first width edge and the convex structure, the angle between the electronic device and a support surface is $\angle\gamma$; and 4) when the electronic device is supported by the second width edge and a convex structure, the angle between the electronic device and the support surface is $\angle\delta$.

In a case that a distance between the first sliding groove length and the first length edge is larger than a distance between the second sliding groove length and the second length edge, $\angle\alpha$ is smaller than $\angle\beta$; and in a case that the distance between the first sliding groove length and the first length edge is equal to the distance between the second sliding groove length and the second length edge, $\angle\alpha$ is equal to $\angle\beta$.

In a case that the first slidable component 2 abuts against the position of the first sliding groove width 4 and the electronic device is supported by the first width edge and the convex structure, $\angle\gamma$ is increased as the second slidable component 20 gets closer to the first sliding groove width 4.

Similarly, in a case that the second slidable component 20 abuts against the position of the second sliding groove width 40 and the electronic device is supported by the second width edge and the convex structure, $\angle\delta$ is increased as the second slidable component 20 gets closer to the second sliding groove width 40.

As an alternative embodiment, the width of the elastic component 10 is any value which is larger than one fifth of the width of the electronic device. In a case that the sliding groove 1 is diagonally arranged on the outer surface of the electronic device, the convex structure and a corner of the electronic device support the electronic device, and the width of the elastic component 10 and the corner of the electronic device form a stable triangle, which allows a stable support to the electronic structure.

An electronic device is provided according to another embodiment of the present application, which differs from the above embodiments in that, the length of the sliding groove 1 is equal to the length of the first edge of the housing. The sliding groove 1 is arranged to be parallel to the first edge or the first width edge, and the first edge is the first length edge or the first width edge. That is, the length of the first sliding groove length is equal to the length of the first length edge or the first width edge. The height of the convex structure formed by the sliding elastic strip arranged in the sliding groove 1 has a large range, and when the first length edge, the second length edge, the first width edge or the second width edge is taken as a support edge, a stable support to the electronic device can be formed.

In an specific implementation, an upper edge of the sliding groove 1 and a bottom edge of the sliding groove 1 may retain the slidable components, and the slidable components are slidable in the sliding groove 1. In an initial state, the elastic component 10 is stretched and is flat in the sliding groove 1, and the slidable components are respectively arranged at two ends of the supporting seat. In a supported usage state, one of the slidable components slides towards the center of the supporting seat, and the elastic component 10 continuously protrudes out of the sliding groove 1, until the slidable component reaches a locking position, and the slidable component is immobilized in the locking position. The elastic component 10 forms an arch convex structure which is perpendicular to the supporting seat, thus supporting the electronic device and forming a certain angle with a support surface.

The sliding elastic strip has an H shape, its two ends, i.e., the two vertical segments of the H shape are the slidable components, and the transverse segment is the elastic component 10. The slidable components always stay in the sliding groove 1, specifically, in a cuff edge and a bottom edge of the sliding groove 1. The width of the elastic component 10 as shown is slightly smaller than the distance between two cuff edges of the sliding groove 1, thus the elastic component 10 can slide out of the sliding groove 1 when the two slidable components get closer to each other.

As an alternative embodiment, the slidable elastic strip is a metal slidable elastic strip or a plastic slidable elastic strip. Thus, the elastic component 10 not only has a certain toughness for providing a support, but also is easy to be in a flat shape.

By the arrangement of the locking positions, an angle formed between the electronic device and a support surface could be any value in a range of 0 degree to 90 degree.

Another embodiment of the present application differs from the above embodiments in that two friction portions are provided on a surface, away from the sliding groove 1, of the slidable elastic strip, and the two friction portions are respectively arranged on two sides of a middle line of the slidable elastic strip. Thus, when a user needs to make the elastic component 10 form the convex structure for supporting the electronic device, the friction portions may be acting points where a user can apply an action force on the elastic component 10, thereby the friction force is increased, and the elastic component 10 will not slide out of the sliding groove, facilitating the elastic strip forming a convex structure.

Another embodiment of the present application differs from the above embodiments in that a ring-pull is formed on a surface, away from the sliding groove 1, of the slidable elastic strip. In a specific implementation, the ring-pull is arranged at a position in the middle of the elastic component 10. By providing the ring-pull with an action force away from the sliding groove 1, a middle point of the elastic component 10 can be moved away from the sliding groove 1, allowing the elastic component 10 to form a convex structure. The arrangement of the ring-pull facilitates an operation of a user.

An electronic device is provided according to another embodiment of the present application, which differs from the above embodiments in that the length of the slidable elastic strip is equal to the length of the sliding groove 1, and the slidable elastic strip covers the sliding groove 1. That is, the slidable elastic strip may abut against the sliding groove 1 when it is in a stretched state, and would not form a convex structure on the outer surface. The outer surface of the housing is a complete screen, which increases the integrity of the electronic device.

An electronic device is provided according to another embodiment of the present application, which differs from the above embodiments in that the electronic device further includes a first locking structure, the first locking structure corresponds to the first locking position located at two ends of the sliding groove 1, and the first locking structure is an end surface of the sliding groove 1.

Two first locking structures are provided. When the slidable elastic strip is stretched, the first slidable component 2 and the second slidable component 20 are immobilized by the two first locking structures in the corresponding first locking position, respectively, which ensures the sliding strip would not slide out of the sliding groove 1 and ensures the outer surface of the electronic device to be flat.

When the slidable elastic strip forms a convex structure, the convex structure forms a push force to the first slidable component 2 and the second slidable component 20, and the first locking structure may immobilize the first slidable component 2 or the second slidable component 20 at the corresponding first locking position.

An electronic device is provided according to another embodiment of the present application, which differs from the above embodiments in that, the electronic device further includes a second locking structure, and the second locking structure corresponds to the second locking position located in the middle of the sliding groove 1, and the second locking structure is a locking-unlocking structure. Thus, the locking-unlocking structure may not only immobilize the first slidable component 2 and/or the second slidable component 20 in a case that the elastic component 10 forms a convex structure, but also facilitate the first slidable component 2 and/or the second slidable component 20 separating from the second locking structure in a case that the elastic component 10 is stretched.

In a specific implementation, the locking-unlocking structure includes: a retaining hook arranged in the housing and exposed at the second locking position of the sliding groove 1; a groove arranged on a surface, contacting with the sliding groove 1, of the slidable component, wherein the retaining hook and the groove cooperate to immobilize the slidable component at the second locking position; and an unlocking structure, wherein the retaining hook can be disengaged from the groove by the unlocking structure and the slidable elastic strip backs to the state in which the slidable elastic strip covers the sliding groove 1 under the action of the elastically deformed elastic component 10.

An electronic device is provided according to another embodiment of the present application, which differs from the above embodiments in that, the retaining hook is provided with an inclined surface in a direction towards the sliding direction of the sliding component under the action of an external force. For enabling the elastic component 10 to be deformed, it is required to apply an action force to the slidable component, forcing the slidable component to slide. By the arrangement of the inclined surface, the slidable component can rise gradually when sliding to the position of the retaining hook, thereby reducing the movement resistance of the slidable component.

An electronic device is provided according to another embodiment of the present application, which differs from the above embodiments in that, the retaining hook is movably connected to the housing via a spring, and a hook head of the retaining hook is exposed to the sliding groove 1 via the spring. A bottom surface of the groove is an operational surface of the slidable component, and the operational surface of the slidable component is made of a flexible material. An external force is applied towards the operational surface to force the hook head to disengage from the groove, thereby disengaging of the retaining hook from the groove. After the retaining hook is disengaged from the groove, the slidable elastic strip backs to the state in which the slidable elastic strip covers the sliding groove 1 under the action of the elastically deformed elastic component 10. Under the action of the spring to the retaining hook, the hook head is exposed to the sliding groove 1, and is covered by the slidable elastic strip. An action force towards the sliding groove 1 is applied to the operational surface of the slidable component, which allows the retaining hook to be disengaged from the groove, thus enabling the elastically deformed elastic component 10 to back to the state in which the slidable elastic strip covers the sliding groove 1 under the action of the elastic force.

As an alternative embodiment, the groove may also be replaced by a through hole, and the through hole runs through the slidable component. Then, when unlocking the slidable component at the second locking position, it is simply required to apply a force to the retaining hook in the direction towards the sliding groove 1 via the through hole, which allows the retaining hook to be disengaged from the through hole, thus enabling the elastically deformed elastic component to back to the state in which the slidable elastic strip covers the sliding groove 1 under the action of the elastic force.

An electronic device is provided according to another embodiment of the present application, which differs from the above embodiments in that, the distance between the two locking structures is smaller than half of the length of the elastic component 10, which allows the convex structure formed by the elastic component 10 to be large, further allowing to support the supporting seat more easily and reliably.

An electronic device is provided according to another embodiment of the present application, which differs from the above embodiments in that, the locking structure is an inserting strip, and when the slidable component move to the locking structure, the inserting strip is inserted, making the slidable component cannot move back, thus immobilizing the slidable component. When it is required to recover the slidable elastic strip, the inserting strip is drawn back, and the slidable component return to the two ends of the supporting seat.

An electronic device is provided according to another embodiment of the present application, which differs from the above embodiments in that, the locking structure may further be a retaining groove with helical teeth.

Figure 3:
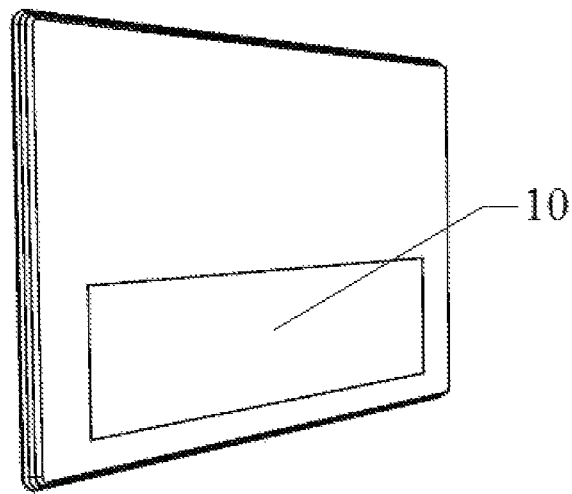
FIG. 3 is a structural schematic view showing an electronic device according to another embodiment of the present application.

As shown in FIG. 3, in the electronic device provided in the above specific embodiments, the state in which the slidable elastic strip covers the sliding groove 1 completely is a tablet usage attitude or a desktop usage attitude.

Figure 4:
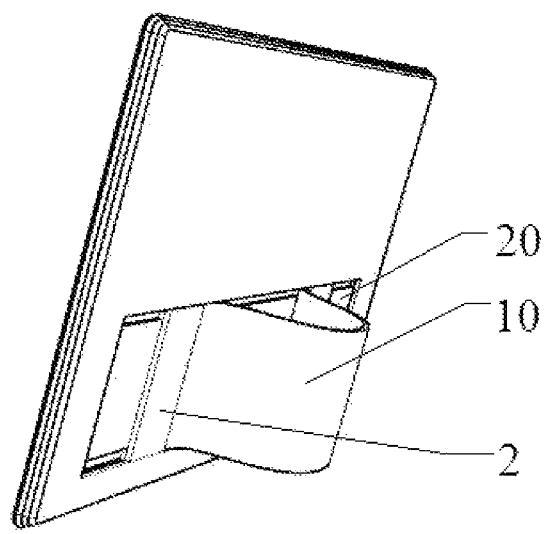
FIG. 4 is a structural schematic view showing the electronic device in a stand usage attitude according to another embodiment of the present application.

As shown in FIG. 4, in the electronic device provided in the above specific embodiments, a state in which a convex structure, which is formed by the elastic component 10 elastically deformed with respect to the outer surface of the housing, together with an edge of the housing of the electronic device, which has a relatively small distance from the convex structure, forms a supporting surface, is a stand usage attitude. The stand usage attitude is suitable for a user to view the display output area.

Figure 5:
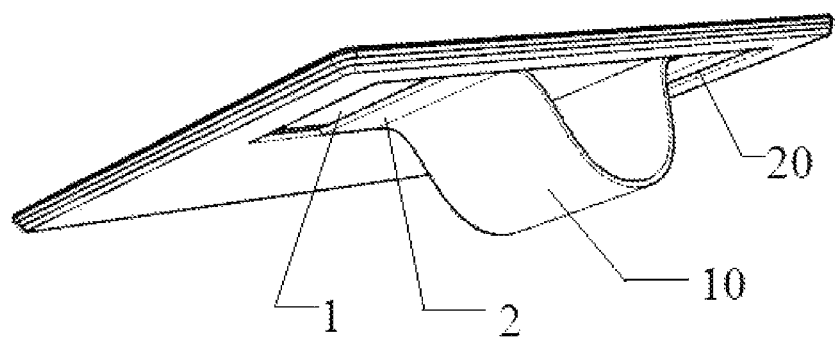
FIG. 5 is a structural schematic view showing the electronic device in an inclined usage attitude according to another embodiment of the present application.
Figure 6:
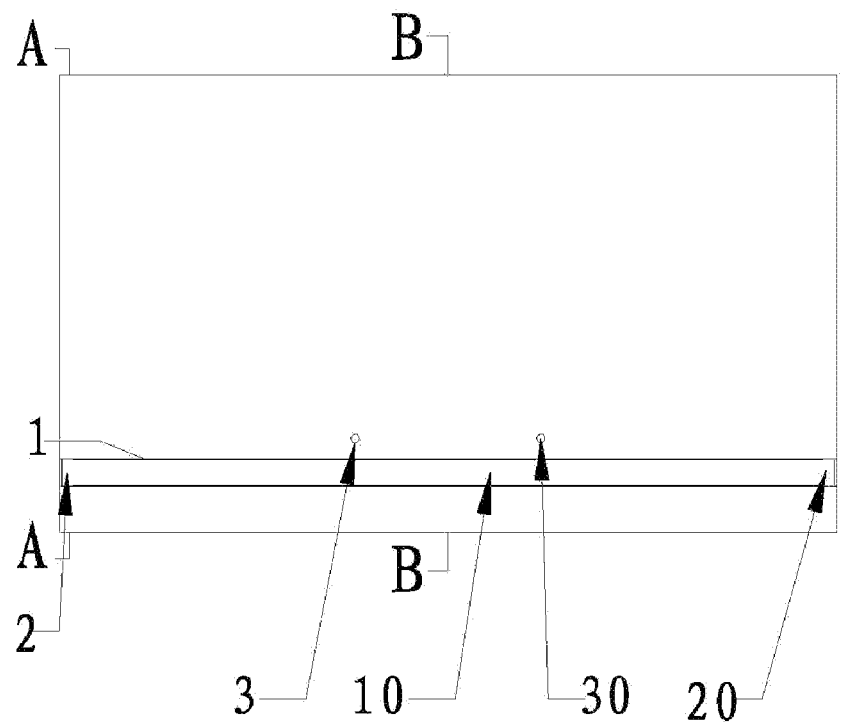
FIG. 6 is a structural schematic view showing the structure of a protective housing of the electronic device according to the present application.

As shown in FIG. 5, in the electronic device provided in the above specific embodiments, a state formed by a convex structure, which is formed by the elastic component 10 elastically deformed with respect to the outer surface of the housing, together with an edge of the housing of the electronic device, which has a relatively large distance from the convex structure, forms a supporting surface, is an inclined usage attitude. The inclined usage attitude is suitable for taking the display device as a virtual keyboard to make input to the electronic device.

The electronic device according to the present application may be a tablet computer or an all in one computer.

An Embodiment of the Protective Housing of the Electronic Device

A protective housing of an electronic device as shown in FIGS. 6 to 9 is configured to protect the electronic device. The protective housing includes: a housing; a sliding groove 1 provided in on outer surface of the housing; a slidable elastic strip including two slidable components and an elastic component 10, wherein the elastic component 10 is fixedly arranged between the two slidable components, and the two slidable components are cooperatively connected to the sliding groove 1, and each of the two slidable components being slidable in the sliding groove 1; at least two locking positions provided on the sliding groove 1, and in a case that any one of the two slidable components slides to any one of the at least two locking positions under the action of an external force, the slidable component is immobilized with respect to the sliding groove 1, forcing the elastic component 10 to deform elastically into a convex structure with respect to the outer surface of the housing, and the convex structure can be used as a supporter of the electronic device for supporting the electronic device on a support surface, wherein the at least two locking positions comprises at least one locking position pair which has two locking positions, between which there is a distance smaller than the length of the slidable elastic strip.

The sliding groove 1 is a cuff structure, and a slidable elastic strip is slidably cooperated in the sliding groove 1, the slidable elastic strip includes two slidable components and an elastic component 10, with the two slidable components being fixedly connected to two ends of the elastic component 10. The sliding groove 1 is a sliding rail for the slidable components, and each of the slidable components is slidably cooperated in the sliding rail. Two locking structures are provided on the sliding groove 1 and are respectively fixedly cooperated with the two slidable components and are configured to allow the elastic component 10 to slide out of the sliding groove 1 and form a convex structure perpendicular to the sliding groove 1 in a case that the slidable components are immobilized in the locking structure.

Figure 7:
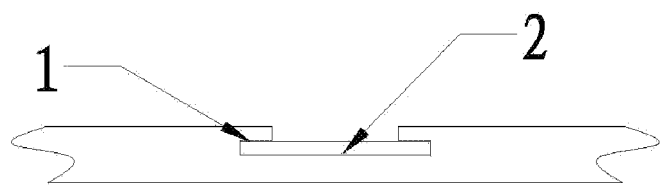
FIG. 7 is a sectional view of FIG. 6 taken along a line AA.

As shown in FIG. 7, a cross section of one side wall of the sliding groove 1 is in an inverted L shape, and an upper edge of the side wall and a bottom edge of the sliding groove 1 are configured to sandwich the slidable component, and the slidable component slides in the sliding groove 1.

Figure 8:
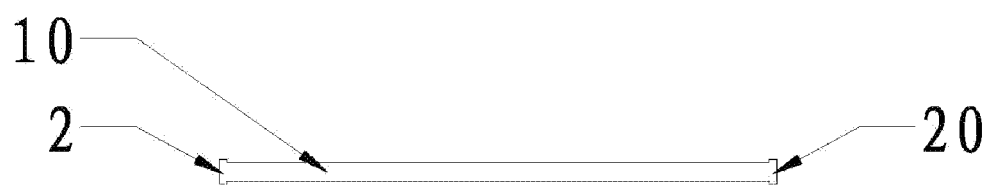
FIG. 8 is a structural schematic view showing a slidable elastic strip according to the present application.
Figure 9:
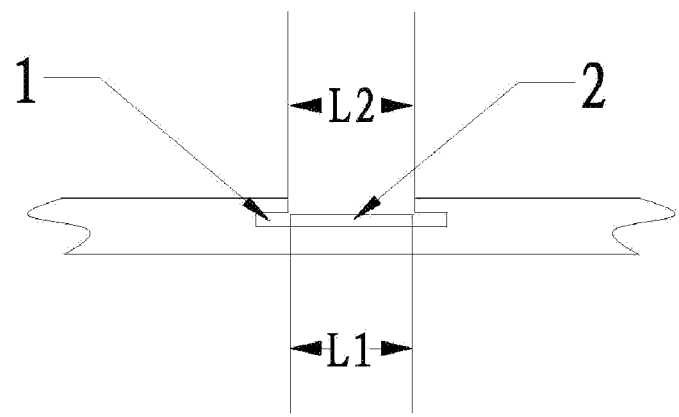
FIG. 9 is a sectional view of FIG. 6 taken along a line BB.

As shown in FIG. 8, the slidable elastic strip is in an H shape, its two ends, i.e., the two vertical segments of the H shape are the slidable components, and the transverse segment is the elastic component 10. The slidable components as shown in FIG. 9 always stay in the sliding groove 1, specifically between a cuff edge and a bottom edge of the sliding groove 1. The width L1 of the elastic component 10 as shown in FIG. 9 is slightly smaller than the distance L2 between the two cuff edges of the sliding groove 1, thus the elastic component 10 can slide out of the sliding groove 1 when the two slidable components get close to each other.

The operation process of the protective housing of the electronic device includes: 1) an initial state: the elastic component 10 is stretched and it is flat in the sliding groove 1, and the slidable components are respectively arranged at two ends of the sliding groove 1; 2) forming a convex structure: the slidable component slides towards the center of the sliding groove 1, and the elastic component 10 continuously protrudes out of the sliding groove 1, until the slidable component reaches a position of the locking structure, and the locking structure immobilizes the slidable component, and the elastic component 10 forms an arch convex structure which is perpendicular to the sliding groove 1, supporting the sliding groove 1 to form a certain angle with respect to the floor.

The locking structure is an inserting strip, and when any one the slidable components move to the locking structure, the inserting strip is inserted, making the slidable component cannot move back, thus immobilizing the slidable component. When it is required to take the slidable elastic strip back, the inserting strip is drawn back, and the slidable components return to the two ends of the supporting seat.

Optionally, the locking structure may further be a retaining hook. And the specific embodiment may be implemented with reference to the inserting strip.

Optionally, the locking structure may further be a retaining groove with helical teeth.

Two ends of the sliding groove 1 are provided with an auxiliary locking structure, respectively, which fixedly cooperate with one of the two slidable components, and are configured to arrange the elastic component 10 in the sliding groove 1 in a case that the slidable components are immobilized by the auxiliary locking structure. Thus the elastic component 10 is stretched and it is flat in the sliding groove 1.

The auxiliary locking structure may further be configured in the form of an inserting strip or a retaining hook.

The slidable elastic strip is a metal slidable elastic strip or a plastic slidable elastic strip. Thus the elastic component 10 not only has a certain toughness providing a support, but also is easy to be deformed into a flat shape.

The distance between the two locking structures is smaller than half of the length of the elastic component 10, allowing the convex structure formed by the elastic component 10 to be large, further allowing to support the sliding groove 1 more easily and reliably.

By means of the above technical solutions, the electronic device according to the present application at least has the following advantages:

1) in the present application, the sliding groove is provided on the housing, and the slidable elastic strip is provided in the sliding groove, and in a case that the sliding elastic strip forms a convex structure, it can be used for supporting the electronic device, thereby achieving an integral formation of the electronic device and the supporter and facilitating carrying by users; and 2) when being in use, after the sliding elastic strip of the present application is formed into a convex structure, the electronic device can be supported, thus it is very convenient for users to operate.

The above descriptions are only embodiments of the present application, and are not limitations in any form to the present application, and any simple alternations, modifications, and equivalents made to the above embodiments according to the technical essential of the present application should fall within the scope of protection of the present application.

What is claimed is:

1. An electronic device, comprising:
   a housing;
   a sliding groove provided on the housing;
   a slidable elastic strip slidably received in the sliding groove; and
   at least two locking positions provided in the sliding groove, the at least two locking positions comprising a first locking position located at two ends of the sliding groove and a second locking position located in the middle of the groove;
   wherein in a case that at least one part of the slidable elastic strip slides to the second locking position and is immobilized at the second locking position, the slidable elastic strip is elastically deformed to form a convex structure between the first locking position and the second locking position, the convex structure and an edge of the housing of the electronic device forming a support surface.

2. The electronic device according to claim 1, wherein the slidable elastic strip comprises two slidable components and an elastic component connected between the two slidable components, and the two slidable components are slidable in the sliding groove, and the at least two locking positions are respectively configured to lock the two slidable components.

3. The electronic device according to claim 2, wherein the length of the sliding groove is equal to the length of a first edge of the housing.

4. The electronic device according to claim 2, wherein
   the length of the slidable elastic strip is equal to the length of the sliding groove, and the slidable elastic strip covers the sliding groove.

5. The electronic device according to claim 1, further comprising:
   a first locking structure, wherein the first locking structure corresponds to the first locking position located at two ends of the sliding groove, and the first locking structure is an end surface of the sliding groove.

6. The electronic device according to claim 1, further comprising:
   a second locking structure, wherein the second locking structure corresponds to the second locking position located in the middle of the sliding groove, and the second locking structure is a locking-unlocking structure.

7. The electronic device according to claim 6, wherein
   the locking-unlocking structure comprises:
   a retaining hook arranged in the housing and exposed at the second locking position of the sliding groove;
   a groove arranged on a surface, contacting with the sliding groove, of the slidable component, wherein the retaining hook and the groove cooperate to immobilize the slidable component at the second locking position; and
   an unlocking structure, which allows the retaining hook to be disengaged from the groove, wherein the slidable elastic strip backs to a state in which the slidable elastic strip covers the sliding groove under the action of the elastically deformed elastic component.

8. The electronic device according to claim 7, wherein
   the retaining hook is provided with an inclined surface in a direction towards the sliding direction of the sliding component under the action of an external force.

9. The electronic device according to claim 7, wherein
   the retaining hook is movably connected to the housing via a spring, and a hook head of the retaining hook is exposed to the sliding groove via the spring;
   a bottom surface of the groove is an operational surface of the slidable component, and the operational surface of the slidable component is made of a flexible material, and an external force is applied towards the operational surface to force the hook head to slide out of the groove, thus disengaging the retaining hook from the groove; and
   wherein after the retaining hook is disengaged from the groove, the slidable elastic strip backs to a state in which the slidable elastic strip covers the sliding groove under the action of the elastically deformed spring, and under the action of the spring to the retaining hook, the hook head is exposed to the sliding groove and is covered by the slidable elastic strip.

10. The electronic device according to claim 2, wherein
a state in which the slidable elastic strip covers the sliding groove completely is a tablet usage attitude or a desktop usage attitude;
a state in which a convex structure, which is formed by the elastic component elastically deformed with respect to the outer surface of the housing, together with an edge of the housing of the electronic device, which has a relatively small distance from the convex structure, forms a supporting surface, is a stand usage attitude; and
a state in which a convex structure, which is formed by the elastic component elastically deformed with respect to the outer surface of the housing, together with an edge of the housing of the electronic device, which has a relatively large distance from the convex structure, forms a supporting surface, is an inclining usage attitude.

11. An electronic device, comprising:
a housing;
a sliding groove provided on the housing;
an elastic strip including two slidable components that are retained in the sliding groove and slidable in the sliding groove;
a first locking structure configured to immobilize the two slidable components of the elastic strip at two ends of the sliding groove; and
a second locking structure configured to immobilize at least one of the two slidable components of the elastic strip at a location between the two ends of the sliding groove, causing the elastic strip to elastically deform and form a convex structure between the two slidable components, the convex structure and an edge of the housing of the electronic device forming a supporting surface.

12. The electronic device according to claim 11, wherein the location is in the middle of the sliding groove.

13. The electronic device according to claim 11, wherein the second locking structure is configured to immobilize both of the two slidable components of the elastic strip at locations between the two ends of the sliding groove.

14. The electronic device according to claim 11, wherein a distance between the first and second locking structures is less than half of a length of the elastic strip.

15. The electronic device according to claim 11, wherein the sliding groove is defined by a bottom edge and a pair of side walls, and at least one of the side walls is in an inverted L shape.

16. The electronic device according to claim 15, wherein two ends of the elastic strip form the two slidable components.

17. The electronic device according to claim 16, wherein the elastic strip is in an H shape, and the two ends of the elastic strip form vertical segments of the H shape.

18. The electronic device according to claim 17, wherein each of the side walls of the sliding groove is in the inverted L shape, and a horizontal segment of the inverted L shape forms two cuff edges of the sliding groove.

19. The electronic device according to claim 18, wherein the two ends of the elastic strip are captured between the bottom edge of the sliding groove and the two cuff edges of the sliding groove.

20. The electronic device according to claim 18, wherein the elastic strip includes a transverse segment extending between the two ends of the elastic strip, and a width of the transverse segment is less than a distance between the two cuff edges of the sliding groove.

* * * * *